United States Patent [19]

Kuribara et al.

[11] Patent Number: 5,156,012
[45] Date of Patent: Oct. 20, 1992

[54] REFRIGERANT CHARGE DETECTION SYSTEM FOR AN AIR CONDITIONING SYSTEM

[75] Inventors: Masaru Kuribara, Tatebayashi; Kazumitsu Kobayashi; Syunji Komatsu, both of Isesaki, all of Japan

[73] Assignees: Sanden Corporation; Japan Electronic Control Systems Company, Ltd., both of Gunma, Japan

[21] Appl. No.: 808,766

[22] Filed: Dec. 17, 1991

[30] Foreign Application Priority Data

Dec. 17, 1990 [JP] Japan .................. 2-403577[U]

[51] Int. Cl.⁵ .............................................. G01K 13/00
[52] U.S. Cl. .................................... 62/129; 73/19.01; 250/565
[58] Field of Search ............... 62/126, 129; 73/19.01, 73/DIG. 11; 250/301, 564, 565

[56] References Cited

U.S. PATENT DOCUMENTS 4,644,755  2/1987  Esslinger et al. ............... 62/126
5,072,595  12/1991  Barbier ............................ 62/129

Primary Examiner—William E. Wayner
Attorney, Agent, or Firm—Baker & Botts

[57] ABSTRACT

An air conditioning system having a circuit for determining whether sufficient refrigerant is present in the system by detecting a phase state of the refrigerant. The circuit comprises a comparison circuit for comparing a detection signal of a state detecting sensor with a first reference value and a second reference value lower than the first reference value. An indication signal is output after the detection signal exceeds the first reference value until the detection signal is less than the second reference value. When the amount of refrigerant in the system is proper, even if the detection signal varies due to translucent lubricating oil in the refrigerant, the indication signal is continued to be output unless the detection signal drops below the second reference value. The amount of refrigerant in the refrigerant circuit can be accurately determined and maintained within a proper range. If the detection signal becomes less than the second reference value from, for example, leakage of refrigerant, the amount of refrigerant in the refrigerant circuit can also be accurately determined as insufficient.

19 Claims, 7 Drawing Sheets

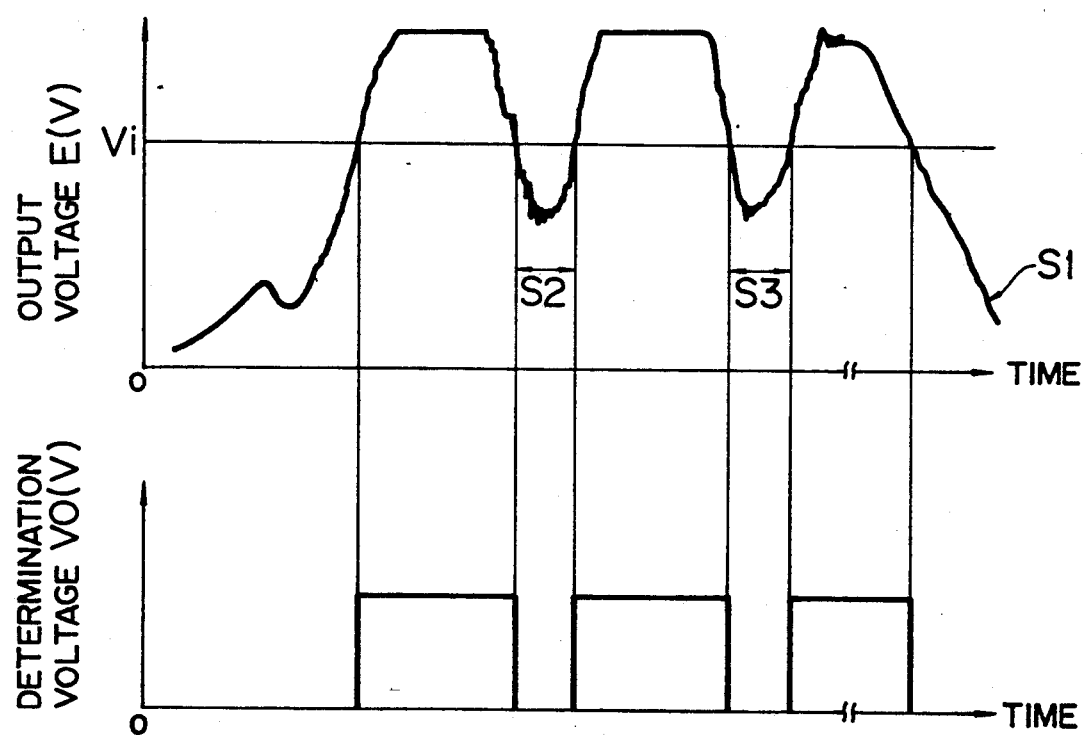
FIG. II
PRIOR ART

REFRIGERANT CHARGE DETECTION SYSTEM FOR AN AIR CONDITIONING SYSTEM

BACKGROUND OF THE INVENTION

1. Field of the Invention

The present invention relates to an air conditioning system suitable for use in vehicles, and more particularly to an air conditioning system for a cooling apparatus having a photoelectric detecting device for detecting a state of refrigerant circulating in a refrigerant circuit.

2. Description of the Prior Art

A typical conventional air conditioning system for vehicles is shown in FIGS. 8 to 10. In FIG. 8, a refrigerant such as freon gas is circulated in refrigerant circuit 1 formed from pipe 2. Compressor 3, condenser 4, expansion valve 8 and evaporator 5 are provided in refrigerant circuit 1 sequentially in the circulation direction of the refrigerant which is shown by arrows "A". The endothermic surface of evaporator 5 is exposed to the interior of the vehicle (not shown). After the refrigerant is compressed by compressor 3, the refrigerant is transformed in phase from a high-pressure gas to a high-pressure liquid in condenser 4 and further to a low-pressure gas as it passes through expansion valve 8 and evaporator 5. When the refrigerant is transformed from a liquid phase to a gaseous phase (vapor phase) by evaporator 5, the refrigerant absorbs heat from the interior of the vehicle and the vehicle interior is cooled. Expansion valve 8 is provided between condenser 4 and evaporator 5. Expansion valve 8 reduces the pressure of the refrigerant to a relatively low pressure so that the liquefied high-pressure refrigerant can be easily vaporized when it passes through evaporator 5.

A receiver tank 6 is provided in refrigerant circuit 1 at a position between condenser 4 and expansion valve 8. Receiver tank 6 temporarily stores refrigerant "F" which has been transformed to a liquid phase. On top of receiver tank 6, an inspection hole 6A is provided for observing the liquefaction of the refrigerant. Receiver tank 6 is connected to introduction pipe 2A and extraction pipe 2B constituting parts of pipe 2, as shown in FIG. 9. A desiccator 7 is provided in receiver tank 6. After the water component of the refrigerant introduced into receiver tank 6 through introduction pipe 2A is removed by desiccator 7, the refrigerant is stored in the receiver tank as a liquefied refrigerant. The liquefied refrigerant is sent to expansion valve 8 through extraction pipe 2B as shown by arrow "A".

An optical type (photoelectric) flow sensor 9 is provided in refrigerant circuit 1 at a position between receiver tank 6 and expansion valve 8 as a refrigerant state detecting device. Flow sensor 9 comprises an emitter 9A for emitting a light into pipe 2B and a receiver 9B for receiving the light transmitted through the pipe. Emitter 9A and receiver 9B are provided on the pipe aligned with each other. Flow sensor 9 detects a phase of the refrigerant passing through pipe 2B, i.e., whether the refrigerant is in a liquid phase.

A determination circuit 10 is coupled to flow sensor 9. Determination circuit 10 is provided for determining a phase of the refrigerant passing through pipe 2B according to a signal sent from flow sensor 9. Determination circuit 10 is shown in FIG. 10. Determination circuit 10 comprises a constant voltage generation circuit 11, a detection circuit 16 coupled to flow sensor 9, an amplification circuit 20, a comparison circuit 24 and an information output circuit 30.

Constant voltage generation circuit 11 is coupled to the plus side "B" of a battery (not shown). Constant voltage generation circuit 11 comprises input compensation capacitor 13 and three terminal regulator 14 which are coupled between plus terminal "B" and ground 12. Output compensation capacitor 15 is coupled between the output of three terminal regulator 14 and ground. Constant voltage generation circuit 11 outputs a constant voltage VCC (for example 5 V).

Detection circuit 16 comprises resistor 17 for controlling a current of emitter 9A, coupled in series to the emitter 9A between the circuit at a voltage of VCC and ground 12, and resistor 18 for controlling a detecting signal of receiver 9B, coupled in series to the receiver 9B between the circuit at the voltage of VCC and ground 12. Junction 19 between receiver 9B and resistor 18 is coupled to amplification circuit 20. Receiver 9B controls a current flowing in accordance with a transmittance of the light transmitted through pipe 2B. A detection voltage "V" controlled in accordance with the above current and the resistance of resistor 18 is output from junction 19 as a detection signal.

Amplification circuit 20 comprises operational amplifier 21, resistor 22 having a resistance of R1 coupled between the inverting terminal of the operational amplifier and ground 12, and feedback resistor 23 having a resistance of R2 coupled between the inverting terminal and the output terminal of the operational amplifier. The non-inverting terminal of operational amplifier 21 is coupled to junction 19 of detection circuit 16. Amplification circuit 20 amplifies the voltage "V" output from detection circuit 16 in accordance with the resistances of R1 and R2 of resistors 22 and 23 at amplification factor "A" calculated by the following equation.

$$A = (R1 + R2)/R1$$

Output voltage "E" of amplification circuit 20 is calculated by the following equation.

$$E = A \times V$$

Comparison circuit 24 comprises operational amplifier 28, and potential dividing resistors 25 and 26 having resistances of R3 and R4, respectively, coupled in series between the circuit at the voltage of VCC and ground 12. Junction 27 between resistors 25 and 26 is coupled to the inverting terminal of operational amplifier 28. Output voltage "E" of amplification circuit 20 is input into the non-inverting terminal of operational amplifier 28. Reference voltage Vi is set by the respective resistances of resistors 25 and 26 as a reference value calculated by the following equation.

$$Vi = (R3/(R3 + R4)) \times VCC$$

Output voltage "E" which is input into the non-inverting terminal of operational amplifier 28 and reference voltage Vi set for the inverting terminal thereof are compared in the operational amplifier. If Vi<E, a determination voltage V0 is output as a high-level signal, and if Vi>E, then the determination voltage V0 is output as a low-level signal.

Information output circuit 30 is provided for indicating or warning a state of refrigerant charged in refrigerant circuit 1. Information output circuit 30 comprises input protective resistor 31, protective resistor 32 coupled between the input protective resistor 31 and ground 12, NPN-type transistor 33 having a switching function whose base is coupled to the input protective resistor 31, and light emitting diode 35 coupled to VCC terminal via control resistor 34 and coupled to the collector of the transistor. The emitter of transistor 33 is coupled to ground 12. Light emitting diode 35 is placed in, for example, an engine compartment or the interior of a vehicle, and functions as an information lamp. If a high-level determination voltage V0 is output from comparison circuit 24, a current flows between the base and emitter of transistor 33 via input protective resistor 31, and current flows between the collector and emitter of transistor 33. Diode 35 emits a light by the turning "on" of transistor 33.

In such a conventional air conditioning system, determination circuit 10 operates, for example, as shown in FIG. 11, when refrigerant is charged into refrigerant circuit 1.

When the amount of charged refrigerant has not yet reached a proper amount, the refrigerant contains a refrigerant of a vapor phase (bubbles) at a position of pipe 2B where flow sensor 9 is provided and the refrigerant should be in a liquid phase if the amount of charged refrigerant reaches a proper amount. Since the transmissibility of a light through the refrigerant of a mixing phase is low, the amount of a light detected by receiver 9B is small. Therefore, output voltage "V" output from detection circuit 16 is low. The output voltage "V" is amplified to a voltage "E" at an amplification factor "A" by amplification circuit 20. The output voltage "E" from amplification circuit 20 is compared with reference voltage Vi in comparison circuit 24. Until output voltage "E" becomes higher than reference voltage Vi, determination voltage V0 output is a low-level signal. As a result, transistor 33 does not turn "on", and light emitting diode 35 does not operate, thus, indicating that the amount of charged refrigerant has not yet reached a proper amount.

When the amount of charged refrigerant has reached a proper amount, the refrigerant present at flow sensor 9 in pipe 2B indicates a complete liquid phase. Namely, refrigerant of a vapor phase does not exist. Therefore, the transmission of a light through the refrigerant increases and is detected by receiver 9B. Output voltage "V" output from detection circuit 16 becomes high, and a high output voltage "E" amplifying the output voltage "V" at an amplification factor "A" is output from amplification circuit 20. The output voltage "E" from amplification circuit 20 is compared with reference voltage Vi in comparison circuit 24. When output voltage "E" exceeds reference voltage Vi, a high-level determination voltage V0 is output from comparison circuit 24. Transistor 33 of information circuit 30 turns "on", and light emitting diode 35 emits a light, indicating that the amount of charged refrigerant has reached a proper amount.

Flow sensor 9 continues to detect a phase of refrigerant present in refrigerant circuit 1 at a position of the exit side of receiver tank 6, after the system is charged with refrigerant. If the amount of refrigerant in refrigerant circuit 1 decreases, for example, from leakage of the refrigerant, the amount of the refrigerant present in the refrigerant circuit gradually decreases, and bubbles of refrigerant are generated. The mixing state of liquid and vapor phases of the refrigerant is detected by flow sensor 9, and output voltage "E" of detection circuit 16 decreases as shown by the characteristic curve "S1" in FIG. 11 and the output of a high-level determination voltage V0 is stopped. The operation of light emitting diode 35 is stopped indicating insufficient amount of refrigerant in the system.

In the conventional air conditioning system functioning in such a manner, however, there are the following problems.

When a refrigerant containing a lubricating oil is charged into refrigerant circuit 1 while compressor 3 is driven, the lubricating oil separates from the refrigerant depending upon temperature, and a part of the lubricating oil insoluble to the refrigerant sometimes turns translucent, or muddy white, in the refrigerant circulating in pipe 2. Since the lubricating oil circulates in refrigerant circuit together with the refrigerant, when the translucent lubricating oil passes through the position provided with flow sensor 9, the light emitted from emitter 9A is partially interrupted by the lubricating oil and the transmitted light received by receiver 9B decreases. Therefore, the characteristic curve of output voltage "E" greatly varies as shown by areas "S2" and "S3" in FIG. 11 when the translucent lubricating oil passes through flow sensor 9, even after the amount of the charged refrigerant has reached a proper amount. As a result, output voltage "E" does not precisely correspond to the state of the refrigerant circulating in refrigerant circuit 1. This output voltage "E" is compared with reference voltage Vi. When output voltage "E" becomes lower than reference voltage Vi, the output of a high-level determination voltage V0 is stopped, and when output voltage "E" becomes higher than reference voltage Vi again, a high-level determination voltage V0 is output again, as shown in FIG. 11. Thus, the output of a high-level determination voltage V0 is repeated. Since the flashing of light emitting diode 35 is repeated in accordance with the variation of determination voltage V0, whether or not the amount of refrigerant is proper be cannot accurately determined.

SUMMARY OF THE INVENTION

Accordingly, an object of the present invention is to provide an air conditioning system which can accurately determine whether the amount of charged refrigerant has reached a proper amount and is maintained within the proper amount, even when translucent lubricating oil is in the refrigerant in a refrigerant circuit to improve the reliability of the system.

To achieve this object, the present invention provides an air conditioning system having a refrigerant circuit for circulating refrigerant, including a compressor, a condenser and an evaporator, a photoelectric refrigerant state detecting device provided on a path of the refrigerant circuit at a position where the refrigerant should be in a liquid phase for detecting a phase of the refrigerant, and a determining circuit coupled to the photoelectric refrigerant state detecting device for determining whether the refrigerant present in the refrigerant circuit is in a state of a proper charged amount in accordance with a detection signal sent from the photoelectric refrigerant state detecting device. The determining circuit comprises a comparison circuit which compares a detection signal of the photoelectric refrigerant state detecting device with a first reference value and a second reference value lower than the first reference value, and continues to output a signal with a predetermined level after the detection signal exceeds the first reference value until the detection signal drops below the second reference value.

In the air conditioning system, when refrigerant is charged into the refrigerant circuit, if the amount of the charged refrigerant has reached a proper amount, the photoelectric refrigerant state detecting device detects it and the detection signal in the determining circuit exceeds the first reference value. The comparison circuit of the determining circuit issues an output signal with a predetermined level, for example, a signal for operating a light emitting diode. The output signal from the comparison circuit is continued to be issued until the detection signal drops below the second reference value. Therefore, even if the detection signal varies due to the generation of translucent lubricating oil in the refrigerant, the output signal from the comparison circuit is continued to be issued unless the detection signal drops below the second reference value. An operator or a driver can precisely and easily recognize that the amount of refrigerant in the refrigerant circuit is maintained within the range of a proper amount. Further, if the detection signal drops below the second reference value by, for example, a leakage of refrigerant, it can be also precisely recognized that the amount of refrigerant in the refrigerant circuit is insufficient.

Preferred embodiments of the invention will now be described with reference to the accompanying drawings, which are given by way of example only, and are not intended to limit the present invention.

BRIEF DESCRIPTION OF THE DRAWINGS

FIG. 11 is a graph showing the relationship between time and an output voltage and a determination voltage in the prior art electric circuit shown in FIG. 10.

DETAILED DESCRIPTION OF THE PREFERRED EMBODIMENTS OF THE INVENTION

Figure 1:
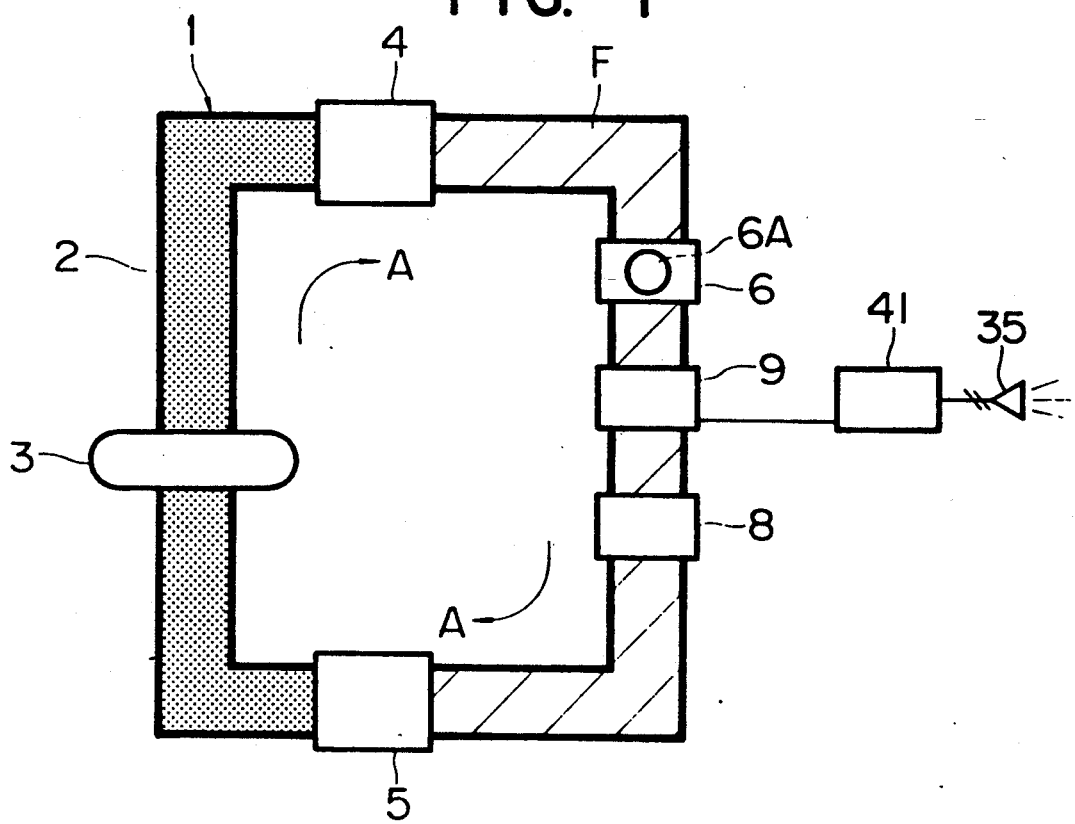
FIG. 1 is a schematic view of an air conditioning system according to a first embodiment of the present invention.
Figure 2:
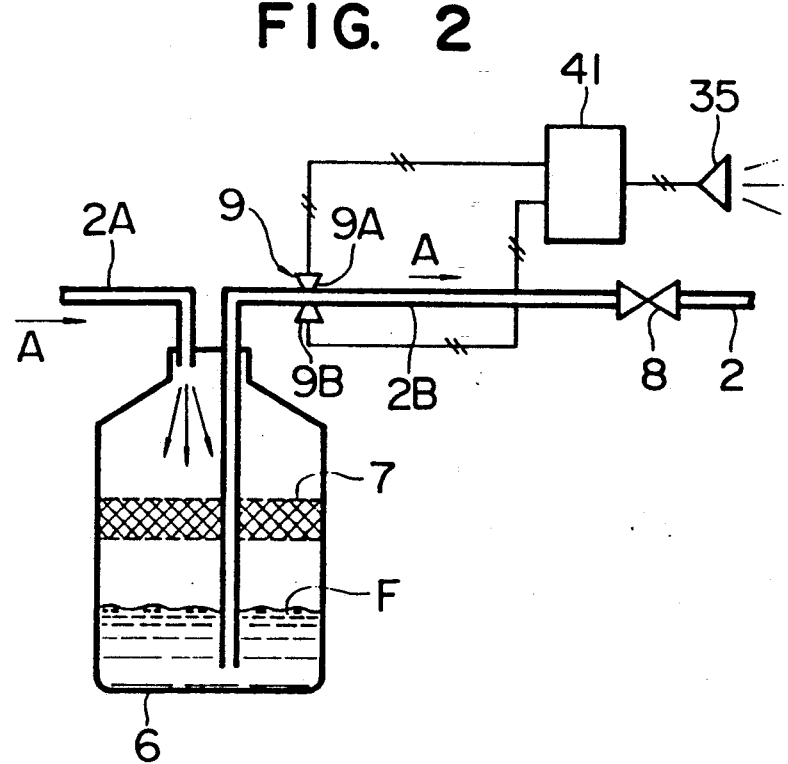
FIG. 2 is an enlarged schematic sectional view of a portion from a receiver tank to an expansion valve of the system shown in FIG. 1.
Figure 3:
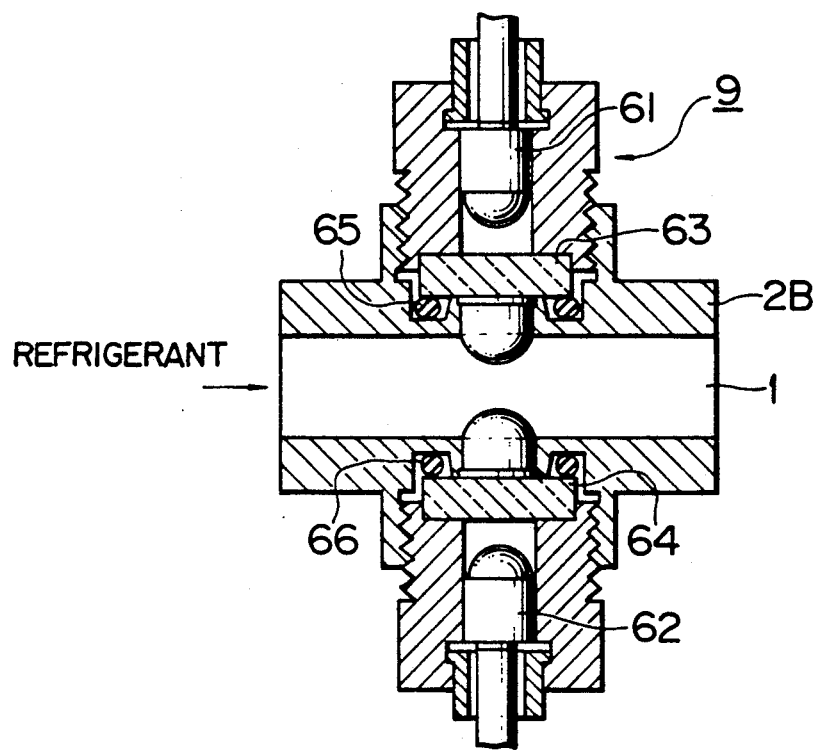
FIG. 3 is an enlarged sectional view of a photoelectric refrigerant state detecting means of the system shown in FIG. 1.
Figure 4:
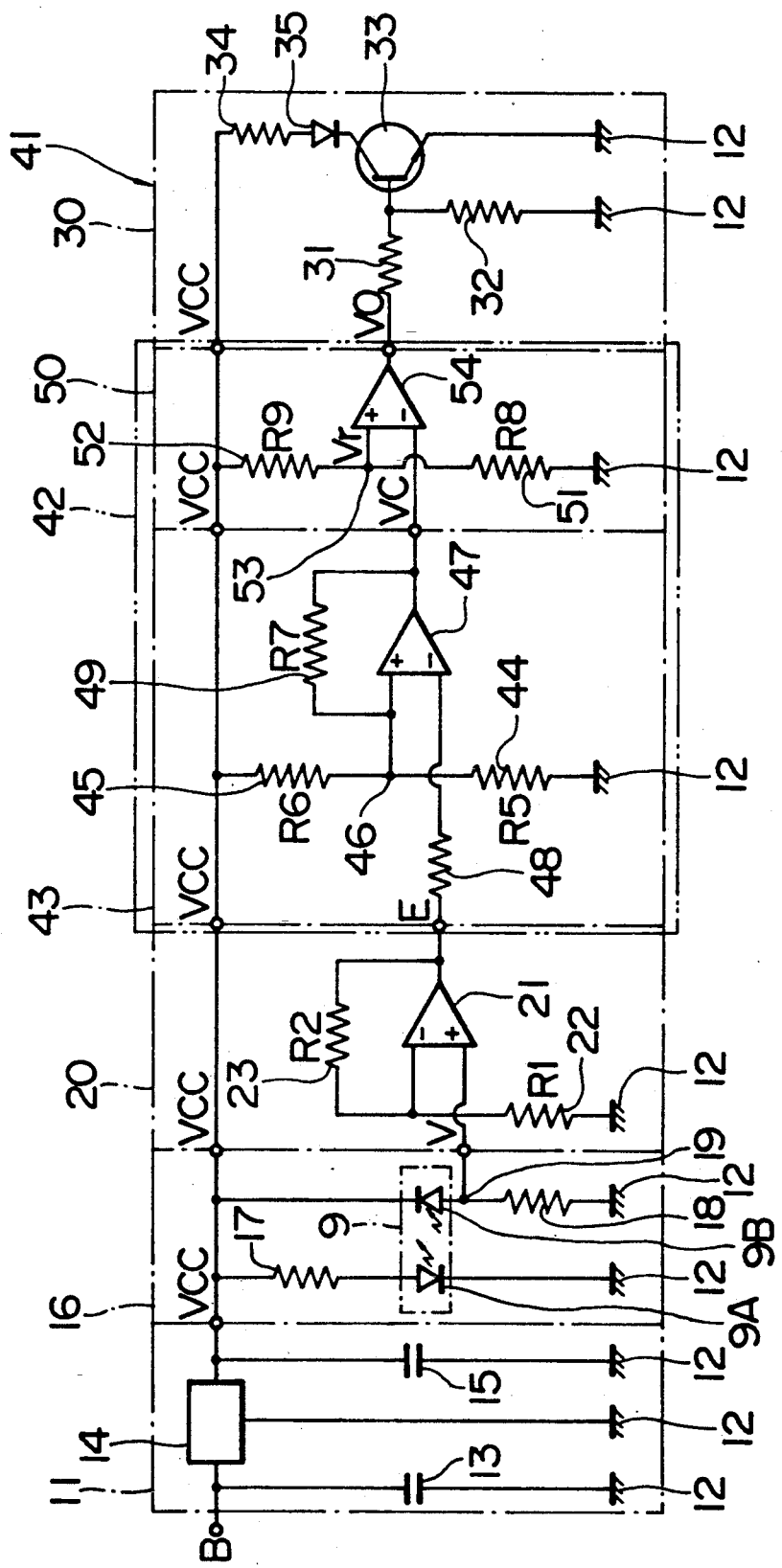
FIG. 4 is a diagram of an electric circuit including a determining means for the system shown in FIG. 1.
Figure 8:
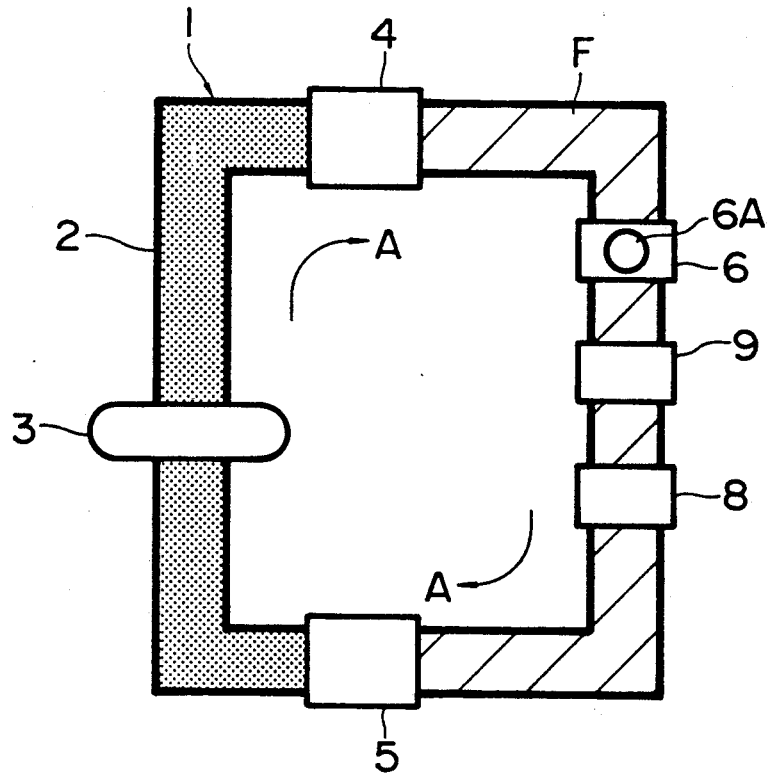
FIG. 8 is a schematic view of a prior art air conditioning system.
Figure 9:
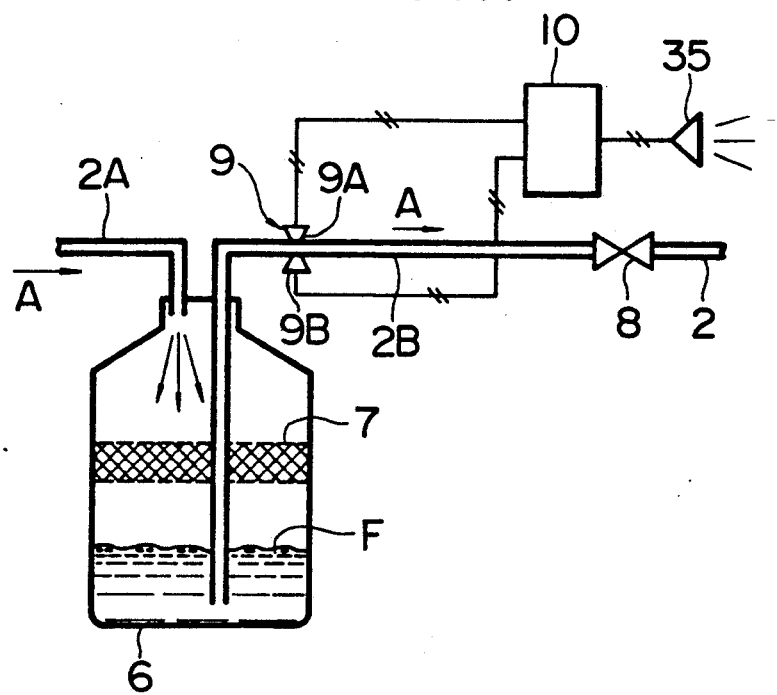
FIG. 9 is an enlarged schematic sectional view of a portion from a receiver tank to an expansion valve of the prior art system shown in FIG. 8.
Figure 10:
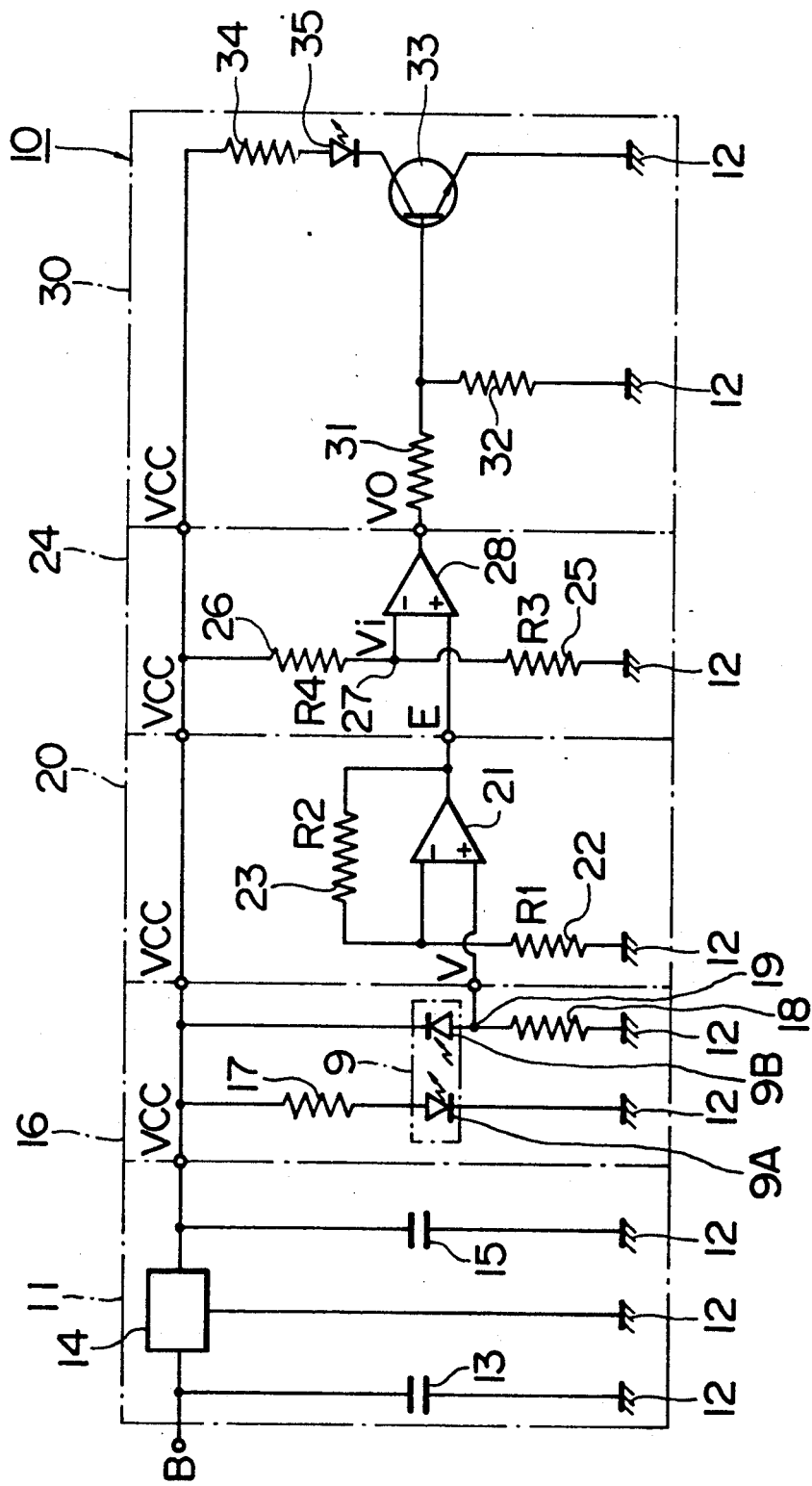
FIG. 10 is a diagram of an electric circuit for the prior art system shown in FIG. 8.

Referring to the drawings, FIGS. 1-4 illustrate an air conditioning system according to a first embodiment of the present invention. In FIGS. 1, 2 and 4, as to elements corresponding to the elements which have been explained in FIGS. 8-10, explanation is omitted by attaching the same reference designators to the elements corresponding to the elements in FIGS. 8-10.

FIG. 3 illustrates a flow sensor 9 provided on pipe 2B as a photoelectric refrigerant state detecting device. Flow sensor 9 comprises a photoelectric sensor. Flow sensor 9 includes emitter 61 emitting a light towards the interior of pipe 2B and receiver 62 for receiving the light transmitted through the pipe (and refrigerant in the pipe). Sensor 9 is attached to pipe 2B so that emitter 61 and receiver 62 are aligned with each other. O-rings 65 and 66 are interposed between sensor 9 and pipe 2B for sealing therebetween. The light emitted from emitter 61 is sent through sight glass 63 into the interior of pipe 2B. The light transmitted through the pipe is received by receiver 62 through sight glass 64. Flow sensor 9 detects transmittance of the light transmitted by emitter 61 and received by receiver 62. The transmittance of the light transmitted through pipe 2B corresponds to the mixing ratio of refrigerant in a liquid phase and refrigerant in a vapor phase existing or flowing in the pipe. As the amount of refrigerant increases, the ratio of refrigerant in a vapor phase to that in a liquid phase decreases and the transmittance of the light increases. Therefore, flow sensor 9 can determine an increase in the amount of refrigerant by measuring transmittance of the light transmitted through pipe 2B. Flow sensor 9 is coupled to detection circuit 16 of determination circuit 41.

FIG. 4 illustrates determination circuit 41. Determination circuit 41 comprises a comparison circuit 42 in addition to constant voltage generation circuit 11, detection circuit 16 coupled to flow sensor 9, amplification circuit 20 and an information output circuit 30 which have been already explained in FIG. 10. Comparison circuit 42 is provided between amplification circuit 20 and an information output circuit 30 and comprises a hysteresis comparator circuit 43 and an inverting circuit 50.

Figure 5:
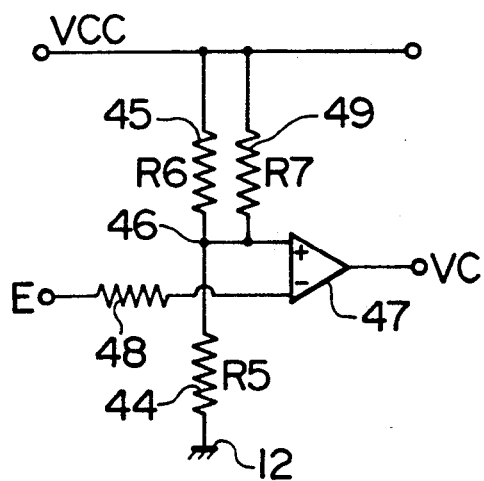
FIG. 5 is a diagram of a comparison circuit equivalent to a comparison circuit in the electric circuit shown in FIG. 4, showing a case where a first reference voltage is set.

Hysteresis comparator circuit 43 comprises an operational amplifier 47 having an inverting terminal, a non-inverting terminal and a feedback circuit, a potential divider and a resistor 48 for an input signal coupled to the inverting terminal of the operational amplifier. The potential divider comprises a resistor 44 having a resistance of R5 and a resistor 45 having a resistance of R6. Junction 46 between resistors 44 and 45 is coupled to the non-inverting terminal of operational amplifier 47. A resistor 49 having a resistance of R7 is provided in the feedback circuit of operational amplifier 47 and coupled to the non-inverting terminal of the operational amplifier. The output voltage "E" of amplification circuit 20 is input into the inverting terminal of operational amplifier 47 via resistor 48. The hysteresis comparator circuit 43 constitutes an equivalent circuit shown in FIG. 5. A first reference voltage VH is set as a first reference value for comparing with output voltage "E" by the following equation.

$$VH = [(R5 \cdot (R6+R7))/(R5 \cdot (R6+R7)+R6 \cdot R7)] \times V_{CC}$$

Figure 6:
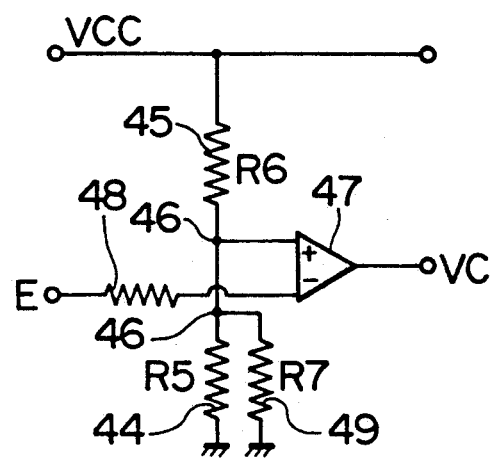
FIG. 6 is a diagram of a comparison circuit equivalent to a comparison circuit in the electric circuit shown in FIG. 4, showing a case where a second reference voltage is set.

Output voltage "E" is input into the inverting terminal of operational amplifier 47, first reference voltage VH is input into the non-inverting terminal of the operational amplifier 47 and the output voltage "E" and the first reference voltage VH are compared in the operational amplifier 47. If VH is lower than "E" (VH<E), comparison voltage VC is output as a low-level signal. If VH is greater than "E" (VH>E), comparison voltage VC is output as a high-level signal. In the case of (VH<E), hysteresis comparator circuit 43 constitutes an equivalent circuit shown in FIG. 6. A second reference voltage VL is set as a second reference value by the following equation. Where, the first reference voltage VH is greater than the second reference voltage VL (VH>VL).

$$VL = [(R5 \cdot R7)/(R6 \cdot (R5+R7)+R5 \cdot R7)] \times VCC$$

In the circuit, when output voltage "E" from amplification circuit 20 is less than first reference voltage VH, comparison voltage VC is output as a high-level signal. When the output voltage "E" becomes greater than the first reference voltage VH, comparison voltage VC is output as a low-level signal. The output of comparison voltage VC is continued until the output voltage "E" becomes less than second reference voltage VL. If the output voltage "E" becomes less than the second reference voltage VL by, for example, leakage of refrigerant, a high-level comparison voltage VC is output again.

Inverting circuit 50 is provided between hysteresis comparator circuit 43 and information output circuit 30. Inverting circuit 50 comprises an operational amplifier 54 having an inverting terminal and a non-inverting terminal, and a potential divider coupled to the non-inverting terminal. The potential divider comprises a resistor 51 having a resistance of R8 and a resistor 52 having a resistance of R9. Junction 53 between resistors 51 and 52 is coupled to the non-inverting terminal of operational amplifier 54. The inverting terminal of operational amplifier 54 is coupled to the output terminal of hysteresis comparator circuit 43. Comparison voltage VC output from the hysteresis comparator circuit is input into the inverting terminal of the operational amplifier 54. The output terminal of operational amplifier 54 is coupled to information output circuit 30, and a determination voltage V0 having a predetermined high-level signal value, output from the operational amplifier, is input into the information output circuit.

In inverting circuit 50, a reference voltage VK is set by the following equation, according to the resistances of resistors 51 and 52.

$$VK = (R8/(R8+R9)) \times VCC$$

Where, reference voltage VK is set lower than comparison voltage VC (VK<VC).

When comparison voltage VC is output as a high-level signal from hysteresis comparator circuit 43, determination voltage V0 from operational amplifier 54 is output as a low-level signal. When the comparison voltage VC is output as a low-level signal, determination voltage V0 having a predetermined high-level signal value is output from operational amplifier 54. Determination voltage V0 is output inverted from comparison voltage VC, as shown in FIG. 7.

In the system of this embodiment, receiver 9B of flow sensor 9 detects a transmittance of the light transmitted from emitter 9A through pipe 2B, that is, through the refrigerant passing through the pipe. Detection circuit 16 outputs a detection voltage "V" in accordance with a signal sent from flow sensor 9. The detection voltage "V" is amplified by amplification circuit 20, and the amplification circuit issues an output voltage "E". The output voltage "E" is input into hysteresis comparator circuit 43. In hysteresis comparator circuit 43, the output voltage "E" is compared with first and second reference voltages. Comparison voltage VC output from hysteresis comparator circuit 43 is input into inverting circuit 50. The comparison voltage VC is inverted in inverting circuit 50, and the inverted voltage is output from the inverting circuit as determination voltage V0. The determination voltage V0 is input into information output circuit 30. The present state of refrigerant in refrigerant circuit 1 is indicated by the operation of light emitting diode 35 in information output circuit 30.

Figure 7:
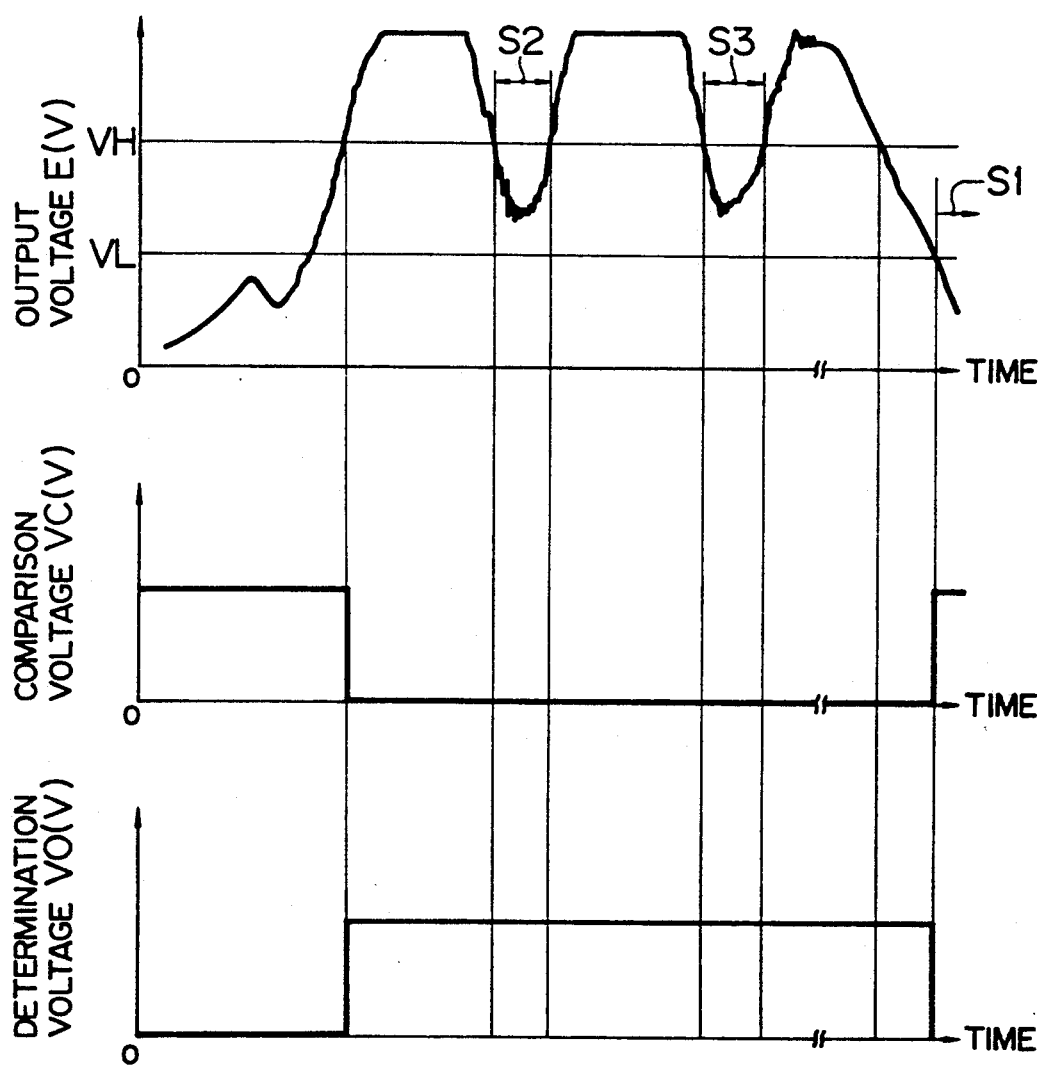
FIG. 7 is a graph showing the relationship between time and an output voltage, a comparison voltage and a determination voltage in the electric circuit shown in FIG. 4.

Namely, as shown in FIG. 7, in a case where the amount of charged refrigerant is insufficient, bubbles of refrigerant (refrigerant in a vapor phase) are generated in the refrigerant circulating in pipe 2, and the transmittance of the light received by receiver 9B of flow sensor 9 is low. Therefore, detection voltage "V" is also at a low level. The detection voltage "V" is amplified by amplification circuit 20, and an amplified output voltage "E" is input into hysteresis comparator circuit 43. In hysteresis comparator circuit 43, the output voltage "E" is compared with first reference voltage VH. When the output voltage "E" is less than the first reference voltage VH, a high-level comparison voltage VC is output from hysteresis comparator circuit 43. Inverting circuit 50 outputs a low-level determination voltage V0 in accordance with the issue of the comparison voltage VC. As a result, light emitting diode 35 in information output circuit 30 does not operate, thereby indicating an insufficient amount of refrigerant.

When the amount of charged refrigerant has reached a proper amount, the phase of the refrigerant circulating in in pipe 2 becomes a complete liquid phase, and there are no bubbles in the refrigerant. The amount of the light received by receiver 9B of flow sensor 9 increases, and detection voltage "V" increases. The detection voltage "V" is amplified by amplification circuit 20, and an amplified output voltage "E" is input into hysteresis comparator circuit 43. In hysteresis comparator circuit 43, the output voltage "E" is compared with first reference voltage VH When the output voltage "E" becomes greater than the first reference voltage VH, a low-level comparison voltage VC is output until the output voltage "E" becomes less than second reference voltage VL. Inverting circuit 50 outputs a high-level determination voltage V0 in accordance with low-level output of the comparison voltage VC. As a result, light emitting diode 35 in information output circuit 30 operates, thereby indicating that the amount of charged refrigerant has reached a proper amount.

When translucent lubricating oil exists in the refrigerant circulating in refrigerant circuit 1 after the amount of charged refrigerant has reached a proper amount, the transmittance of the light received by receiver 9B of flow sensor 9 varies, and detection voltage "V" and output voltage "E" amplifying the detection voltage also greatly vary as shown in FIG. 7. However, even if output voltage "E" varies lower than first reference voltage VH (areas "S2" and "S3"), because the output voltage "E" does not drop lower than second reference voltage VL, a high-level comparison voltage VC is not output from hysteresis comparator circuit 43 until the output voltage "E" drops lower than the second reference voltage. Therefore, inverting circuit 50 continues to output a high-level determination voltage V0. As a result, light emitting diode 35 in information output circuit 30 continues to operate, thereby accurately indicating that the amount of refrigerant in refrigerant circuit 1 is maintained within a proper range of amount.

As the amount of refrigerant in refrigerant circuit 1 gradually decreases by, for example, a leakage of the refrigerant, refrigerant of vapor phase (bubbles of refrigerant) in the refrigerant present in the refrigerant circuit gradually increases. Since the amount of the light received by receiver 9B of flow sensor 9 gradually decreases by the bubbles, detection voltage "V" and output voltage "E" amplifying the detection voltage gradually drops. As shown in FIG. 7, if the output voltage "E" drops lower than second reference voltage VL as shown by area "S1", a high-level comparison voltage VC is output from hysteresis comparator circuit 43. Therefore, inverting circuit 50 outputs a low-level determination voltage V0. As a result, light emitting diode 35 in information output circuit 30 stops its operation, thereby accurately indicating that the amount of refrigerant in refrigerant circuit 1 has fallen into a state of an insufficient amount.

Thus, in this embodiment, comparison circuit 42 comprises hysteresis comparator circuit 43 and inverting circuit 50, and first reference voltage VH and second reference voltage VL are set in the hysteresis comparator circuit. The reference voltages VH and VL are appropriately set and the difference between the reference voltages is set appropriately large. Therefore, even if output voltage "E" (detection voltage "V") varies by translucent lubricating oil circulating in refrigerant circuit 1 together with refrigerant, inverting circuit 50 continues to output a high-level determination voltage V0 and light emitting diode 35 continues to operate for indicating that the refrigerant in the refrigerant circuit is maintained to be within a range of a proper amount.

Moreover, since the above control for removing the affection of translucent lubricating is also effective when the amount of refrigerant in refrigerant circuit 1 gradually decreases by, for example, a leakage of the refrigerant, the state that the refrigerant leaks to an undesired level can be also accurately detected by the operation wherein, when output voltage "E" approaches second reference voltage VL, light emitting diode 35 flashes depending on the variation of the output voltage "E", and when the output voltage "E" becomes lower than second reference voltage, the insufficient amount of refrigerant can be accurately indicated by operation of the light emitting diode.

Although comparison circuit 42 is constructed from hysteresis comparator circuit 43 and inversion circuit 50 in the embodiment, the comparison circuit can be constituted by only the hysteresis comparator circuit by connecting potential dividing resistors 44 and 45 and feedback resistor 49 to the inverting terminal of operational amplifier 47 and inputting output voltage "E" into the non-inverting terminal of the operational amplifier.

Further, although light emitting diode 35 is employed as an indication device in the embodiment, the indication device is not particularly restricted. For example, a sound transducer or a buzzer can be used as the indication device.

Although several preferred embodiments of the present invention have been described herein in detail, it will be appreciated by those skilled in the art that various other embodiments, as well as modifications and alterations to the described embodiments may be made without materially departing from the novel teachings and advantages of this invention. Accordingly, it is to be understood that all such other embodiments, modifications and alterations are included within the scope of the invention as defined by the following claims.

What is claimed is:

1. A refrigerant circulating circuit of an air conditioning system comprising:
    a compressor;
    a condenser coupled to an output of said compressor;
    an evaporator coupled to an output of said condenser and to an input of said compressor;
    state detecting means coupled between said condenser and said evaporator for detecting a phase of refrigerant in the circulating circuit and outputting a detection signal related to the detected phase; and
    determining means, coupled to said state detecting means, for outputting a first indication signal and a second indication signal, said first indication signal being output when the detection signal indicates a first detected phase, the second indication signal being output when the detection signal indicates a second detected phase,
    said determining means including a comparison circuit which compares said detection signal with a first reference signal when said second indication signal is output, and with a second reference signal when said first indication signal is output.

2. The refrigerant circulating circuit according to claim 1, wherein said determining means further includes an amplification circuit coupled between said state detecting means and said comparison circuit, and display means responsive to the indication signals for indicating the detected state of the refrigerant.

3. The refrigerant circulating circuit according to claim 2, wherein said display means includes a transistor coupled to the comparison circuit and responsive to the indication signals, and visual display means coupled to the transistor for visually indicating the detected state of the refrigerant.

4. The refrigerant circulating circuit according to claim 3, wherein said visual display means includes a light emitting diode.

5. The refrigerant circulating circuit according to claim 2, wherein said display means includes a sound transducer means for providing an audible indication of the state of the refrigerant detected by the state detecting means.

6. The refrigerant circulating circuit according to claim 2, wherein said display means includes a buzzer.

7. The refrigerant circulating circuit according to claim 1, wherein said state detecting means comprises a sensor for sensing a transmittance of light of the refrigerant.

8. The refrigerant circulating circuit according to claim 7, wherein said sensor comprises an emitter for emitting light and a receiver for receiving light transmitted through the refrigerant.

9. An apparatus for sensing a state of charge of refrigerant in a refrigerant circulating circuit comprising:

sensing means for sensing the phase state of refrigerant in the circulating circuit and a state signal related to the detected phase state of the refrigerant; and detecting means responsive to the state signal for generating a first refrigerant charge indication signal and a second refrigerant charge indication signal, said first refrigerant charge indication signal being generated when the state signal indicates a first detected phase state, said second refrigerant charge indication signal being generated when the state signal indicates a second detected phase state, said detecting means including comparison means for comparing said state signal with a first reference signal when said second refrigerant charge indication signal is generated, and for comparing said state signal with a second reference signal when said first refrigerant charge indication signal is generated.

10. The apparatus according to claim 9, wherein said sensing means includes a sensor for detecting a transmittance of light through the refrigerant.

11. The apparatus according to claim 9 further comprising display means responsive to said detecting means for indicating the state of charge of refrigerant in the circuit.

12. The apparatus according to claim 11, wherein said display means provides a visual indication of the state of charge of refrigerant in the circuit.

13. The apparatus according to claim 11, wherein said display means provides an audible indication of the state of charge of refrigerant in the circuit.

14. The apparatus according to claim 9, wherein said comparison means includes a comparator circuit having hysteresis.

15. An apparatus for processing a phase state signal output from a refrigerant phase sensing device of a refrigerant circulating circuit and indicating the state of charge of refrigerant in the circulating circuit, the output phase state signal related to a sensed phase of refrigerant in the circulating circuit, the apparatus comprising:

an input node adapted for receiving the phase state signal; and a comparison circuit coupled to the input node for generating a first refrigerant charge indication signal and a second refrigerant charge indication signal, said first refrigerant charge indication signal being generated when the phase state signal indicates a first detected phase, the second refrigerant charge indication signal being generated when the phase state signal indicates a second detected phase, said comparison circuit comparing said phase state signal with a first reference signal when said second refrigerant charge indication signal is generated, and with a second reference signal when said first refrigerant charge indication signal is generated.

16. The apparatus according to claim 15 further comprising an amplification circuit coupled between the input node and the comparison circuit.

17. The apparatus according to claim 15 further comprising an indication circuit responsive to the comparison circuit for providing a visual indication of the state of charge of refrigerant in the circulating circuit.

18. The apparatus according to claim 15 further comprising an indication circuit responsive to the comparison circuit for providing an audible indication of the state of charge of refrigerant in the circulating circuit.

19. A refrigerant circulating circuit of an air conditioning system comprising:

a compressor;

a condenser coupled to an output of said compressor;

an evaporator coupled to an output of said condenser and to an input of said compressor;

state detecting means coupled between said condenser and said evaporator for detecting a phase of refrigerant in the circulating circuit and outputting a detection signal related to the detected phase; and determining means, coupled to said state detecting means, for outputting a first indication signal and a second indication signal, said first indication signal being output when the detection signal indicates a first detected phase, the second indication signal being output when the detection signal indicates a second detected phase, said determining means including a comparison circuit which compares said detection signal with a first reference signal when said second indication signal is output, and with a second reference signal lower than said first reference signal when said first indication signal is output.

* * * * *